United States Patent [19]

Wilkerson, Jr.

[11] Patent Number: 4,966,655

[45] Date of Patent: Oct. 30, 1990

[54] PLASTIC COVERED SOLAR STILL

[76] Inventor: William M. Wilkerson, Jr., 4214 University Dr., Charlotte, N.C. 28209

[21] Appl. No.: 229,778

[22] Filed: Aug. 5, 1988

Related U.S. Application Data

[63] Continuation of Ser. No. 355, Jan. 5, 1987, abandoned.

[51] Int. Cl.⁵ .............................................. B01D 3/00
[52] U.S. Cl. .................................... 202/234; 126/415; 126/450; 159/903; 202/267.1; 203/86; 203/DIG. 1
[58] Field of Search ................ 203/DIG. 1, DIG. 17, 203/10, 86; 202/181, 234, 267.1; 159/903; 126/450, 415

[56] References Cited

U.S. PATENT DOCUMENTS

| | | | |
|---|---|---|---|
| 983,424 | 2/1911 | Brosius | 159/903 |
| 1,812,516 | 6/1931 | Dooley | 159/903 |
| 2,848,389 | 8/1958 | Bjorksten | 203/DIG. 17 |
| 2,877,164 | 3/1959 | Meyer | 159/903 |
| 3,006,818 | 10/1961 | Lappala et al. | 202/234 |
| 3,104,210 | 9/1963 | Mount | 202/234 |
| 3,408,260 | 10/1968 | Feldman et al. | 202/234 |
| 3,653,150 | 4/1972 | Howard | 202/234 |
| 3,655,517 | 4/1972 | Hensley, Jr. et al. | 202/234 |
| 4,010,080 | 3/1977 | Tsay et al. | 202/234 |
| 4,137,901 | 2/1979 | Maier | 203/DIG. 1 |
| 4,227,970 | 10/1980 | Howell, Jr. et al. | 202/234 |
| 4,235,679 | 11/1980 | Swaidan | 202/234 |
| 4,440,861 | 4/1984 | McCarthy | 159/903 |
| 4,606,794 | 8/1986 | Wyckoff | 159/903 |

FOREIGN PATENT DOCUMENTS

| | | | |
|---|---|---|---|
| 0594131 | 11/1947 | United Kingdom | 159/903 |
| 0743539 | 1/1956 | United Kingdom | 159/903 |

OTHER PUBLICATIONS

Roget's International Thesaurus, 3rd ed., pp. 355.13–357.9.

Hay, "New Concepts in Solar Still Design", First International Symposium on Water Desalination, Oct. 3–9, 1965.

Primary Examiner—Virginia Manoharan

[57] ABSTRACT

An open wire frame formed of wire ladder stock having intersecting right angle wires includes at least one upwardly inclined open frame section overlying an underlying open pan and terminating at a lower edge in a downward directed projection of U-shape and being fixedly mounted relative to the underlying pan. A flexible thin film solar energy transmissive sheet overlies the open wire frame and is stretched tightly about the frame to form a downwardly facing condensation surface and an upwardly facing U-shaped collection trough along the lower edge thereof for condensate collection. The open wire frame may have vertical free ends for penetration into the ground or into the sides of the upwardly open pan. Strips of wood, metal, etc., fastened by screws, etc., may sandwich the lower sides of the flexible thin film sheet against the side walls of the upwardly open pan to maintain the sheets stretched about the open wire frame and complete an enclosure about the pan.

4 Claims, 2 Drawing Sheets

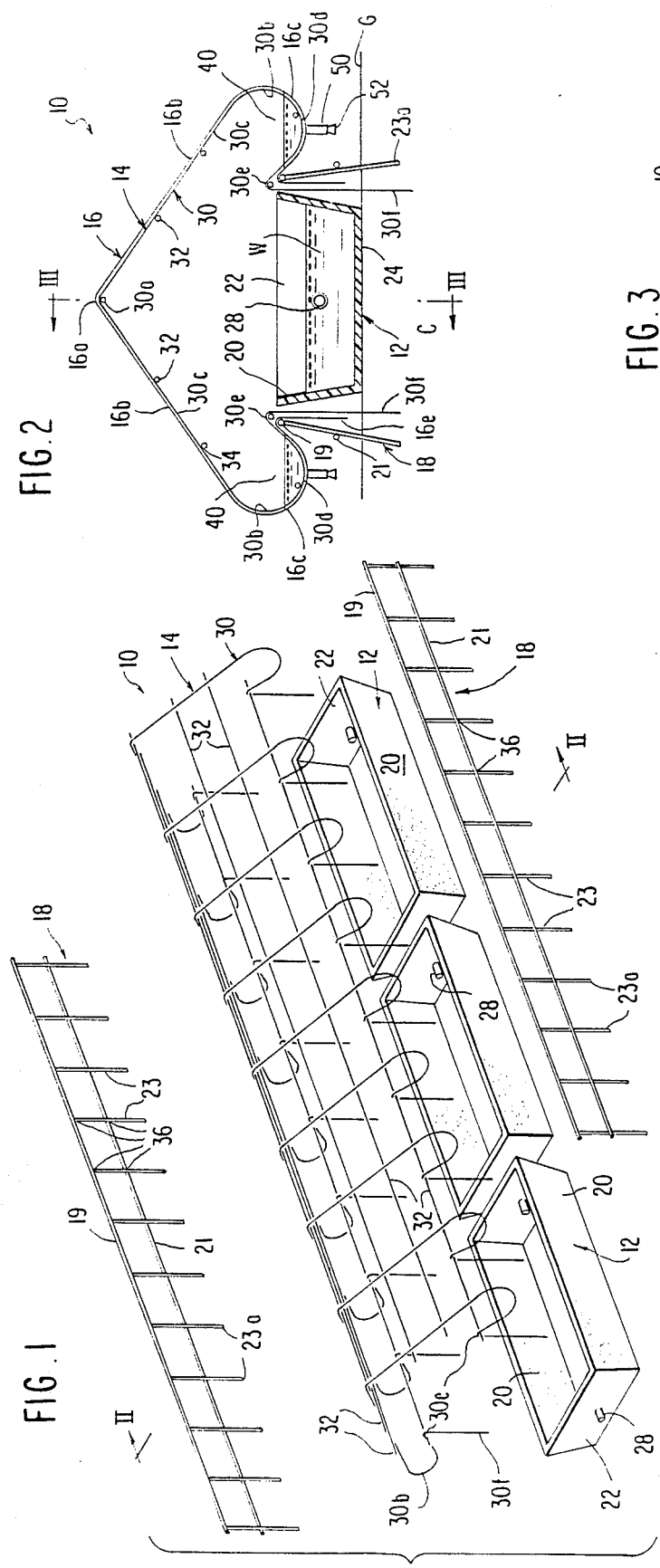
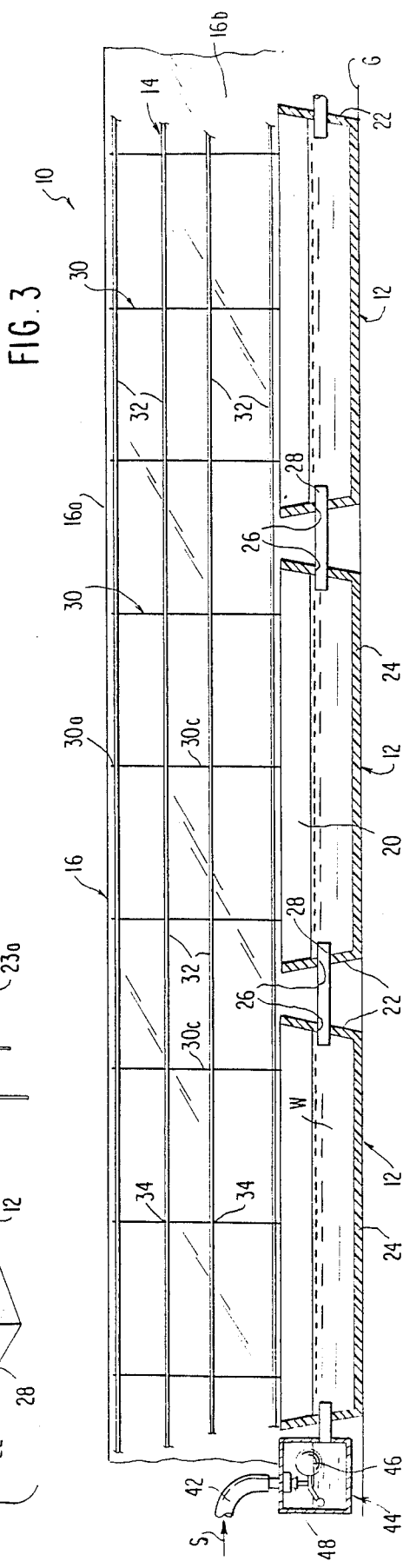

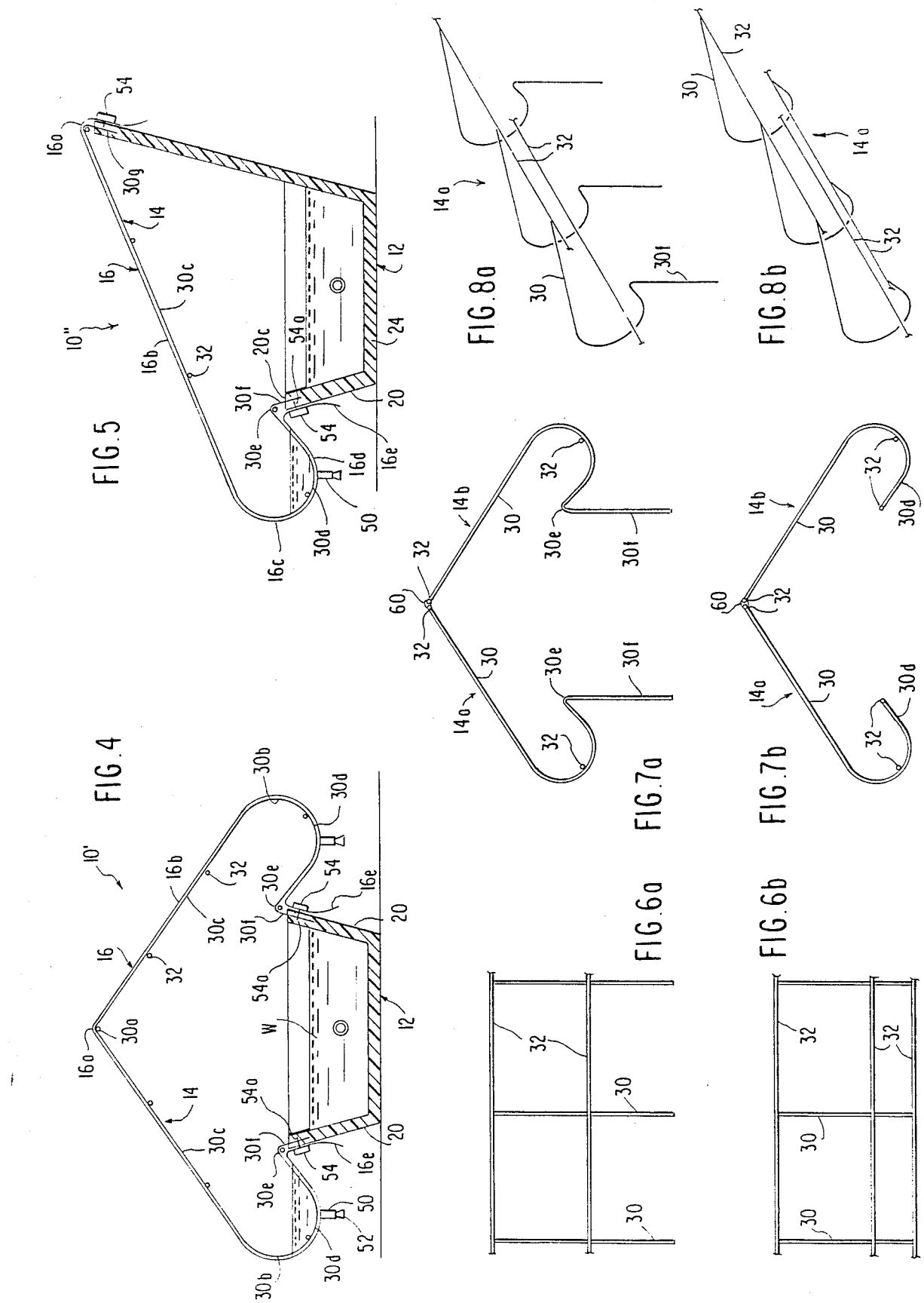

PLASTIC COVERED SOLAR STILL

This is a continuation of application Ser. No. 000,355, filed Jan. 5, 1987.

FIELD OF THE INVENTION

This invention relates to solar stills and more particularly to a solar still formed of readily available low cost components and in which the components may form a highly compact kit, prior to assembly.

BACKGROUND OF THE INVENTION

Low cost solar stills have been produced in the past, in emergency kit form or otherwise, for permitting the transformation of potable water from salt water, particularly sea water. Most of the solar stills in which the solar power is the sole energy source for distilling water have been plagued by high cost, complex construction, high maintenance and insulation costs.

Attempts have been made to produce a relatively simple, low cost solar still which performs adequately, can be stored in a relatively small space and is effective as survival equipment. The still set forth in British Patent No. 1,166,840, is characterised by an inflatable tubular fabric member in ring form having thereon a layer of a liquid solar energy absorbent material. A tent-like canopy of a solar energy transmissive material covers the liquid solar energy absorbent material and is in raised position and separated therefrom for providing an air space therebetween. Means are provided for feeding liquid to the liquid absorbent material by capillary action such that the solar energy transmitted through the canopy, and onto the solar energy absorbent material causes the liquid contained therein to evaporate and to subsequently condense as a distillate on the underside of the canopy, from which it is collected. While the structure of the British patent is fairly effective, the utilization of fabric components and the use of an air tube complicates the structure and makes it relatively expensive.

U.S. Pat. No. 2,848,389, issued Aug. 19, 1958, is directed to a solar still which is relatively simple. It is composed principally of an underlying support formed of insulation material and a vertically upright thin wall receptacle for salt water, resting upon and at least partially surrounded by the insulating material base or support. The structure is completed by a relatively rigid transparent plastic sheet of arcuate form whose open side faces downwardly, and which terminates at the opposite edges in integral, rigid, curved channels and which may be are linked to or integrated with the salt water receptacle centered between the channels and fixed to the insulation material support. In the various embodiments, a relatively rigid transparent sheet is required to be molded into the desired curved shape to produce the arcuate overlying cover and the upwardly facing arcuate channels 3 and 4 to opposite sides thereof and at the lateral edges of the cover sheet. In the system of U.S. Pat. No. 2,848,389, the saline water can be pumped into the salt water receptacle for periodic refilling. The components of the solar still are preferably formed of a substantially rigid, transparent, organic, synthetic resinous polymeric material.

The structures of U.S. Pat. No. 2,848,389, involve rigid molded plastic components which do not lend themselves to forming a compact kit and require the expense of rigid molding with attendant weight problems.

It is therefore a primary object of the present invention to provide a low cost simplified solar still for distilling water which uses a thin film, flexible plastic sheet material, which film sheet material may be in bag form, and which conforms to and is maintained by a wire frame assembly, which functions both to define a moisture condensing surface and to form one or more integral collection troughs and which utilizes a commercially available foam insulation pan for the salt water to be distilled.

SUMMARY OF THE INVENTION

The invention is directed to a light weight, solar still comprised of at least one upwardly open, thermally insulated pan for holding a liquid to be distilled, an open wire frame overlying said pan and being spaced therefrom and a flexible, thin film, solar energy transmissive sheet overlying said open wire frame and stretched about the frame. The open wire frame preferably includes at least one upwardly inclined open frame section overlying said open pan and terminating in a lower edge downwardly projecting portion of U-shape to define a similar sized, U-shaped channel or collecting trough within said thin film flexible sheet running along the side of said still and stretched about the wire frame. The thin film, flexible, solar energy transmissive sheet permits the solar energy to enter the still, boil off or evaporate the liquid in the pan, functions to form a downwardly facing condensation surface, and defines a collection trough for the condensate along at least one lower edge of said sheet without the necessity of using a further structural component as the collection trough.

The open wire frame preferably comprises thin wire rods intersecting each other and fixed to each other at the intersections thereof. Preferably, the open wire frame includes a plurality of longitudinally spaced generally triangular shaped vertical frame members having integral, depending U-shaped projections at laterally opposed apex portions to opposite sides thereof for defining distilled liquid collector troughs within the thin flexible film sheets in contact with the frame and stretched thereabouts, at said apices. The generally triangular shaped vertical frame members may be joined by longitudinally extending straight wire segments spaced from each other and fixed to the triangular shaped vertical frame members including the area of the U-shaped projections at the laterally opposed apex portions thereof.

Preferably, the interior surface of the pan is blackened to absorb the solar energy passing through the thin flexible sheet to facilitate boiling of the liquid within the pan. A metal or flexible thin film liner may be carried by a foam insulation cover to form the pan. The "pan" may also consist of outer box holding wire frame and sheet edge fastener, with insulation and metal liner "nested" inside of box and forms three parts: the outer box, insulation, and waterproof liner.

The series of longitudinally spaced generally triangular shaped vertical frame members of triangular cross section may terminate in downwardly directed. vertically free wire ends with said wire ends embedded in respective, laterally opposed vertical side walls of said pan. Alternatively, vertical supports fixedly mounted adjacent to the side walls of the pan sandwich the edges of the thin film flexible sheet between the vertical supports and the side walls of said pan or box. Preferably at least one tubular drain is fitted to each portion of said thin film flexible sheet stretched about each vertical U-shaped frame member apex projection within said wire frame to facilitate draining of distilled liquid captured within the collector trough formed thereby. Flexible adhesive tape, or a U-shaped longitudinal, external support, may be placed on outer surface of plastic sheet at collection trough area to strengthen plastic sheet in this area. Multiple pans may be positioned in a longitudinal array or series with a liquid transfer tube passing through opposed end walls of longitudinally adjacent pans for facilitating flow of liquid to the pans to be solar vaporized and condensed on the thin film flexible sheet interior surface above the pans. A self regulating valve may be provided within the inlet tube to the upstream pan of the series for controlling the flow of liquid to be distilled to said series of pans.

A plurality of fasteners or slats may be mounted to the side walls of the pan to fix the sides of the thin film flexible sheet to the pan side walls to stretch the sheet about the wire frame and to form and maintain a collector trough along at least one side of the solar still and at the lower edge of the upwardly inclined portion of the thin film flexible sheet.

The opposed side walls of the pan may be of different vertical heights with the frame including a flat portion extending obliquely downward from the higher side wall to the lower side walls and terminating in a reverse bend portion defining said U-shaped depending projection within the open wire frame for defining the collector trough within the thin film flexible sheet stretched about that portion of the open wire frame.

The open wire frame may be formed of wire ladder stock with a series of laterally spaced wires at right angles to each other, and fixed to each other at the intersections thereof with said wire ladder stock bent into a "J" configuration along at least one edge thereof to form said U-shaped depending projection.

All of the embodiments may be reduced to kit form, in that the components can be put into a relatively flat package, such as: outer box components, foam liner, water proof liner, if needed, wire supports, plastic sheet and drain tubes, and plastic sheet edge fasteners.

BRIEF DESCRIPTION OF THE DRAWINGS

FIG. 1 is an exploded, perspective view of a thin flexible plastic sheet covered solar still forming a preferred embodiment of the invention.

FIG. 2 is a vertical sectional view of the solar still of FIG. 1 taken about line II—II.

FIG. 3 is a longitudinal sectional view of the solar still of FIG. 2 taken about line III—III.

FIG. 4 is a sectional view of a solar still forming an alternate embodiment of the present invention.

FIG. 5 is a vertical sectional view of a solar still forming yet a third embodiment of the present invention.

FIGS. 6a and 6b are plan views of two forms of preformed wire ladder stock material from which the wire frame of the solar stills of FIGS. 1-5 may be made.

FIGS. 7a and 7b are end views of alternate forms of the open wire frames utilizing two lateral mirror image halves connected together at the roof apex thereof.

FIGS. 8a and 8b are respective perspective views of one of the frame halves of the frames of FIGS. 7a and 7b.

DESCRIPTION OF THE PREFERRED EMBODIMENTS

In the various figures like elements for the various embodiments are given like numerical designations. Reference to FIGS. 1-3, inclusive, illustrates a preferred embodiment of the invention. The solar still is indicated generally at 10 and consists of four basic components. A longitudinal series or array of upwardly open, foam plastic pans or trays 12, an open wire frame indicated additionally at 14, a thin film, preferably transparent or translucent, flexible, plastic sheet indicated generally at 16 and a pair or set of vertical fences 18 also, of open wire frame form. Alternatively, longitudinal slots may be employed to fasten plastic sheet to edges of pans. These strips or slats may have a rubber or foam covered upper edge, in order to prevent premature failure or splitting of the plastic sheet which they hold in place.

The foam plastic trays are of generally elongated rectangular form, and comprised of laterally spaced side walls 20 and opposite end walls 22, which walls may be vertical or near vertical and integral with a horizontal bottom wall 24. Preferably, the interior of the walls is painted black so as to absorb the heat passing through the thin film flexible plastic sheet 16.

The open wire frame 14 in the illustrated embodiment of FIGS. 1-3, inclusive includes a plurality of vertical wire frame members indicated generally at 30 having an upper roof section being of generally triangular shape with one apex 30a at the top, and a pair of laterally spaced lower, side apices 30b to opposite sides of vertical center line C. The upper apex 30a and the lower apices 30b are joined and defined by downwardly and outwardly, oppositely oblique wire portions 30c. The wire vertical frame 30 is bent so as to form downwardly depending U-shaped projections 30d and are reversely bent at 30e to terminate in free vertical ends 30f. This permits the free wire ends 30f to be driven into the ground G adjacent to the lateral side walls 20 of the pans 12. The open wire frame 14 is completed by having a number of horizontal straight wires or stringers 32 soldered welded or otherwise fixedly attached to the longitudinally spaced vertical frame members 30. The weld points are indicated at 34. Preferably, one of the horizontal wires or stringers 32 adjoins the top apex 30a of the series of longitudinally spaced vertical frame members 30 and one or more horizontal stringers 32 may be welded or soldered to the vertical frame members 30 between the upper apex 30a and the side apices 30b. Further, preferably a horizontal stringer 32 is fixed to the reverse bend points 30e where, the vertical free wire ends extend downwardly from the triangular portion of the vertical frame members 30. The open wire frame 14 defines the roof structure of the still 10, subject to being covered by the roofing material, in this case the thin film flexible plastic sheet 16. The reverse bends 30e act in conjunction with the depending U-shaped projections 30b within the vertical frames 30 to define a pair of collecting troughs or channels 40 within sheet 16, to opposite sides of the still 10 with the thin film flexible sheet 16 tightly wrapped about the exterior of the open wire frame 14. In order to effect that result, the unit illustrated employs fences 18 constituting vertical side walls or supports mounted adjacent to the lateral side walls 20 of the pans 12, strips or slats of wood, metal or plastic may be substituted therefore. In the illustrated embodiment of FIGS. 1-3, inclusive, these walls are the open wire frame fences 18. The fences 18 consist of two horizontal straight wire rails at 19, 21 to which are welded, a series of short length wire posts 23. The wire posts 23 are welded at their tops and intermediate of their vertical ends to respective rails 19, 21 at weld points 36 with the free ends 23a of the posts 23 being driven into the ground G closely adjacent to the lateral sides 20 of the pans 12. The thin film flexible plastic sheet 16 is wrapped about wire frame 14 with its lateral sides 16e sandwiched between the fences 18 and the pan sidewalls 20 so that the thin film flexible sheet 16 conforms to the configuration of the open wire frame 30 over its whole height and length. This requires the thin film flexible sheet 16 to form roof portions 16b to opposite sides of a ridge line 16a at the center of the sheet. and to form integral channel portions 16c to conform to the downwardly directed U-shaped projections 30d of vertical frame members 30 and to then curve upwardly over the upper edge of the slats 18 while the sides 16e of the thin film flexible sheet are (frictionally) gripped between the slats or strips 18 and the exterior surface of the pan side walls 20, see FIG. 2.

Alternatively, vertical strips of wood, plastic or sheet metal may be employed in lieu of the open frame fence 18 to perform that function, it being only necessary to fixedly locate the rigid members so as to effect a frictional grip between the sides 16e of the plastic sheet 16 and the pan side walls to insure the maintenance of one or more collecting troughs 40 for the still pan. To maintain a liquid within the pans 12 for vapor evaporation thereof and distillate condensation on the interior surface of the roof portion 16b of the thin film flexible plastic sheet 16, holes 26 are formed within the end walls of the pans at some height above the bottom wall 24 of the pans, and the pans are connected by short lengths of hose, tubing or the like at 28. The water or other liquid to be evaporated and distilled is fed from a supply, arrow S. FIG. 3, via a supply hose 42, which has a float control valve, indicated schematically at 44, having a float 46 and a moveable valve element 48 for controlling the level of a liquid such as water W within the various tube connected pans 12. Water W indicated is supplied to the various pans 12 as needed to operate the still.

In order to remove the condensed salt free water W from the collecting troughs 40, there is provided within the thin flexible sheet at appropriate locations distillate drain tubes 50 which may include removable plugs 52 so that a given amount of distillate W may be accumulated in the troughs prior to draining the same.

From the illustrated embodiment of FIGS. 1-3, inclusive, it may be seen that the ground mounted solar still utilizes one or more thermally insulated raw water pans 12 or like. Suitable containers 12 preferably have the interior surfaces darkened to maximize the evaporative capacity of the solar still. The open wire frame 14 functions as a rigid support for the plastic sheet 16, provides no impairment of the solar rays penetrating the interior chamber 54 defined by the open wire frame 14 and the thin film flexible sheet 16. Further, the plastic sheet 16 adequately forms a cover for the still, isolating chamber 54 from the exterior, and a continuous roll of thin film flexible plastic such as PVC or the like may be used as the cover for the open frame 14. Additionally, the plastic sheet edge fasteners necessary to lock the lower edges 16e of the thin film flexible plastic sheet may be formed of wood, plastic, metal, or the like, requiring some means for physically mounting them so as to sandwich the thin film flexible sheet sides 16e between those members and the laterally spaced side walls 20 of the pan or pans 12.

Turning to FIG. 4, a self contained still is illustrated at 10, and consists of an open wire frame 14, preferably foam plastic, upwardly open pans or containers 12 and the thin film flexible plastic sheet 16. The basic units are essentially identical to those within the still 10 of the embodiment of FIGS. 1-3, inclusive. The frame 14a includes downwardly projecting, upwardly open U-shaped projection 30d at the lateral side apices 30b so as to form the channels or collecting troughs 40 to opposite sides of the still when the thin film flexible plastic sheet 16 is stretched about the same.

The difference in this case is that the free ends 30f of the vertical frame members 30 are considerably shortened from the version shown in FIGS. 1-3, and give to each side thereof, a J-shaped configuration and, instead of projecting into the ground are embedded within the vertical side walls 20 of the pan or pans 12 so that the pan or pans 12 directly support the open frame 14. The still 10 utilizes a number of plastic sheet edge fasteners such as headed thumb tacks or screws 54 strips of wood, plastic, or metal, attached by screws, etc., or which penetrate the side wall 20 of the pan 12 to lock the sides 16e of the thin flexible sheet 16 to the side walls 20 of the pan or pans 12. In all other respects the embodiment of FIG. 4 is identical to that of FIGS. 1-3, inclusive. Preferably the interior of the pans 12 (or metal or thin film liners) are blackened to enhance vaporization such as liquid of the water W carried thereby. The sheet 16 is provided with one or more distillate drain tubes 50 as in the prior embodiment. The frame member 14 consists of a plurality of longitudinally spaced vertical frame members 30 integrally joined by horizontal stringers 32.

Referring next to FIG. 5, a further embodiment of the solar still is illustrated at 10". In this embodiment, the pan or pans 12 are similarly composed of the bottom wall 24 and opposite side walls 20. In the embodiment of FIG. 5 the side wall 20 to the left is considerably shorter than that to the right. The open wire frame 14 has a J-shaped configuration and includes a single, flat, or arcuate (to a slight degree) inclined roof portion 30c and a single downwardly directed U-shaped projection or portion 30d. A short length free end 30f projects into the upper edge 20c of the left side wall 20 of the tray 12. The upper end of the sloped roof portion 30c of the vertical frame member 30 of J-shaped configuration is provided with a further free end 30g which is embedded within the upper end of the much higher right side wall 20 of pan 12. One or more horizontal stringer 32 may be provided to prevent sagging of the film. In this embodiment, the thin film flexible plastic sheet 16 has an upper edge 16a, a roof portion 16b, and a collecting trough defining portion 16c, a reverse bend portion 16d and side edge 16e. In this embodiment, similar to the embodiment of FIG. 4, a number of plastic sheet edge fasteners 54 are employed which may take the form of strips of wood or the like attached by fasteners or thumbtacks having shanks 54a penetrating the thin film flexible sheet 16 and locking the upper and lower edges 16a, 16e to the outside surfaces the laterally spaced side walls 20 of the tray 12.

FIGS. 6a and 6b illustrate wire ladder stock or starting material to form the open wire frames 14 of the various embodiments. In that respect, the wires 30 and 32 intersect each other at right angles. The wires 30, 32 may form squares, as for instance in FIG. 6a, or some of wires 32 may be spaced closer together than others, preferably facilitating the creation of the collecting troughs in the areas where the wires are more closely spaced. FIGS. 7a and 7b show end views in which the open wire frames 14 are formed of joined halves 14a, 14b from the ladder stock of FIGS. 6a and 6b, respectively. In the simplified showings of FIGS. 7a and 7b a pair of wire ladder stock segments, consisting of longitudinal stringers 32 and transverse wires 30, are bent into mirror image form as halves 14c, 14b and joined together at their center at upper ends by welding or soldering as at 60. FIGS. 7a and 7b. In FIG. 7a, the free ends 30g of the transverse wires 30 take a reverse bend at 30e to give the configuration necessary to form the collecting troughs to the thin flexible plastic sheet (not shown). In FIGS. 6b 7b, and 8b, the horizontal stringers 32 are much closer spaced in the trough defining area for the wire frame, and the mirror image sections are formed such that one of the stringers 32 is at the U-shaped projection to the outward side of the vertical frame member 30 and another stringer 32 is at the inboard end of the U-shaped projection, while a third stringer 32 is at the upper end of the vertical frame member 30 to be joined by suitable welds or the like as at 60. The mirror image portions 14a, 14b of the vertical frame 14 formed from the ladder stock segments are given the prescribed configuration. FIGS. 8a and 8b illustrate perspectively after forming the configuration of the wire ladder stock material wire frame halves 14c, 14b.

As may be appreciated, it is possible that by utilizing other configurations of vertical supports for the horizontal stringers 32 an arrangement of stringers 32 may be had which eliminates the need for vertical wire frame members such as those at 30, FIGS. 1-3, inclusive. In one such an arrangement it is necessary only to provide a plurality of horizontal stringers which could be of wooden rod form and with the plastic cover wrapped about the same and properly tensioned at its opposite ends. As long as the thin film, flexible plastic sheet 16 is held in a state of tension stretched around the stringers with some type of edge fastener holding the sheet fast, the result, depending upon the position of the stringers, is to create a given configuration for the sheet in a manner akin to the various illustrated embodiments. Alternatively, it is contemplated that a major number, if not all, of the stringers 32 may be eliminated by using a large number of vertical frame members as at 30 which are at close longitudinal spacing and under proper tension of the thin, flexible film plastic sheet to create and maintain the collecting troughs. Further, in kit form, the still may consist of an upwardly open insulative material tray or pan within an open wire frame with a flexible thin sheet bag stretched tightly over the open wire frame and including one or more built in collection troughs defined by a downward U-shaped projection within the open wire frame.

While the invention has particularly shown and described with reference to preferred embodiments thereof, it will be understood by those skilled in the art that the foregoing and other changes in form and details may be made therein without departing from the spirit and scope of the invention.

What is claimed is:

1. A solar still comprising at least one elongated upwardly open thermally insulated pan for holding a liquid to be distilled, said pan having first and second elongated side walls each having a top edge with said first side wall being higher than said second wall, an open wire frame comprised of a plurality of wire frame members each having a J-shaped configuration disposed in spaced apart parallel vertical planes respectively, each wire frame member having first and second ends, an elongated substantially straight portion adjacent said first end and a substantially U-shaped portion adjacent said second end, means for securing said first end of each wire frame member to said first side wall adjacent the top edge thereof with said straight portion inclined downwardly towards said second side wall, means for securing said second end of each wire frame member to said second side wall adjacent the top edge thereof with said U-shaped portion extending adjacent the top edge of said second wall outside of said pan, a thin film flexible solar energy transmissive sheet having side edges overlying said frame and means for securing said side edges of said sheet to said side walls adjacent said top edges thereof and for maintaining said sheet in engagement with said frame to define a first downwardly inclined surface overlying said pan upon which evaporated liquid will condense, a trough portion outside of said pan for collecting condensation flowing down said inclined surface, and at least one longitudinally extending straight wire stringer extending along said wire frame members to prevent sagging of the sheet between said wire frame members.

2. A solar still as set forth in claim 1, wherein said pan is comprised of a foam plastic material with said first and second ends of each wire frame member being imbedded in the top edges of said first and second side walls.

3. A solar still as set forth in claim 1, further comprising drain means secured to said trough portion.

4. A solar still as set forth in claim 1 wherein said at least one elongated upwardly open thermally insulated pan comprises a plurality of pans disposed in a row with tubing means interconnecting said pans for transfer of liquid from one pan to another, each pan having a plurality of said wire frame members and wherein said sheet extends continuously over said plurality of pans.

* * * * *